J. WISE.
SELF HEATING SOLDERING TOOL.
APPLICATION FILED JAN. 9, 1908.
930,010.
Patented Aug. 3, 1909.
2 SHEETS—SHEET 1.
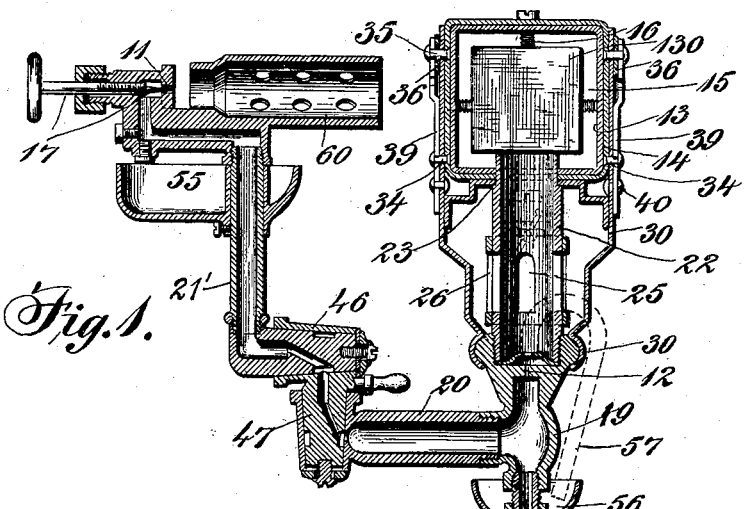
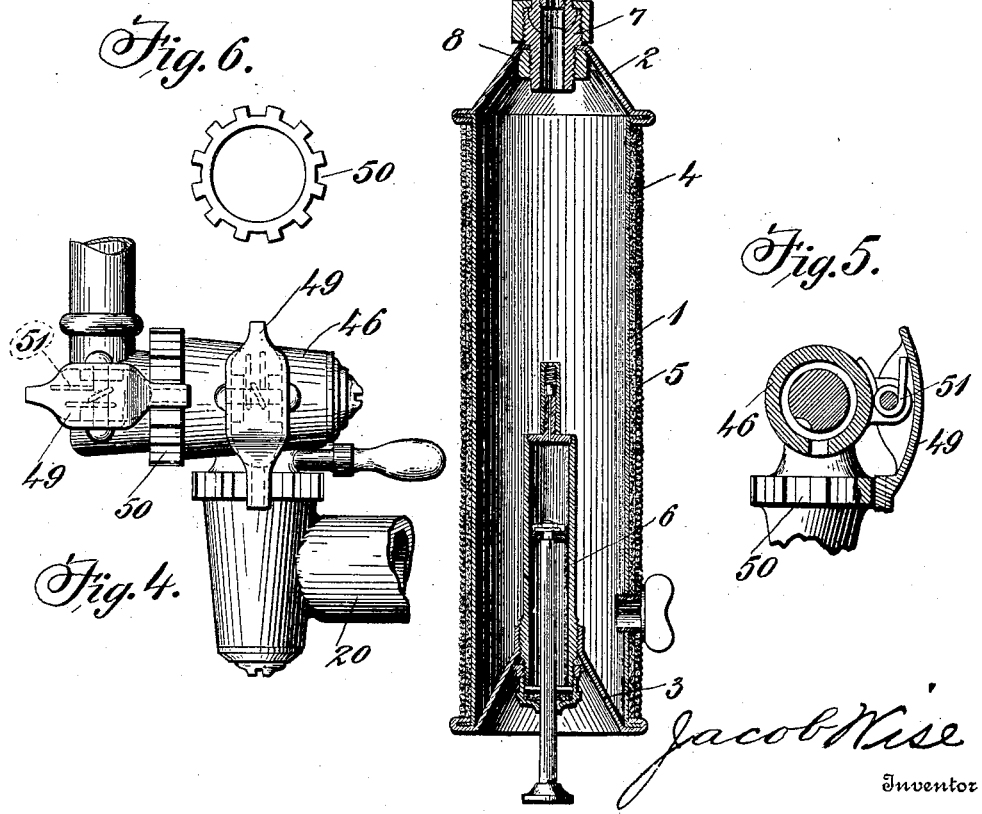
Jacob Wise
Inventor

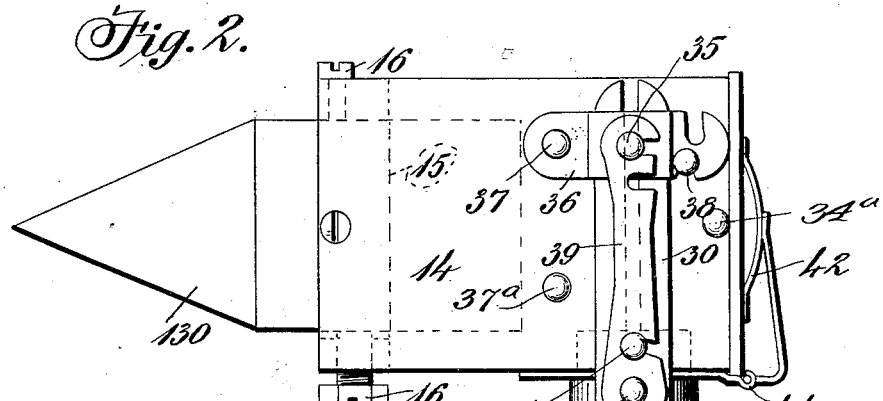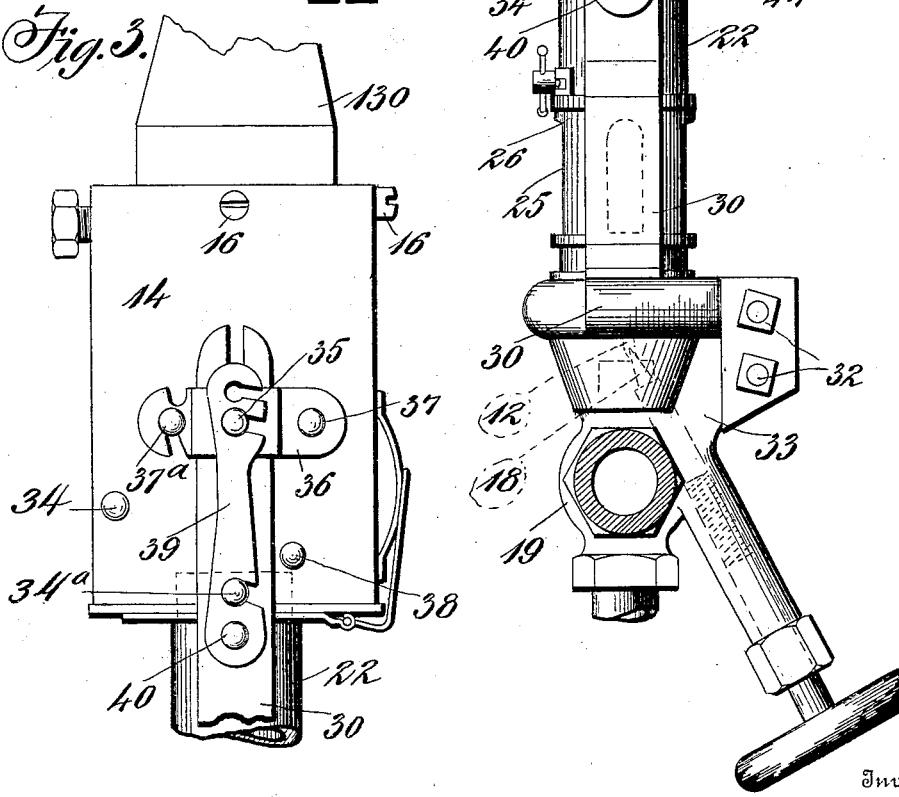

UNITED STATES PATENT OFFICE.

JACOB WISE, OF CHICAGO, ILLINOIS.

SELF-HEATING SOLDERING-TOOL.

No. 930,010.  Specification of Letters Patent.  Patented Aug. 3, 1909.

Application filed January 9, 1908. Serial No. 409,951.

*To all whom it may concern:*

Be it known that I, JACOB WISE, subject of the Emperor of Russia, residing at Chicago, in the county of Cook and State of Illinois, have invented certain new and useful Improvements in Self-Heating Soldering-Tools, of which the following is a specification.

This invention is a soldering tool of the self-heating type, and in addition to means for heating the soldering iron, also includes means for heating the work at the same time, so that the work can be kept hot as well as the iron. It is particularly adapted for soldering fine wires on commutators of dynamos or motors, but of course is adapted for any other work to which it may be applied.

The device for heating the work is so supported or connected that it can be adjusted to or from the work, so that it can be turned out of the way when not needed; and it also has a valve so that it can be turned on or off when desired. The apparatus also has other advantages resulting from the self-heating feature, or as hereinafter more particularly described.

In the accompanying drawings Figure 1 is a sectional view of the tool. Fig. 2 is a detail in side elevation showing particularly the heater for the iron. Fig. 3 is a similar elevation showing a different adjustment from that shown in Fig. 2. Fig. 4 is a detail in elevation of the valve fitting to the work heater. Fig. 5 is a detail in section of part of Fig. 4. Fig. 6 is a detail in plan.

Referring specifically to the drawings, 1 indicates a gasolene tank or vessel, which also forms the handle of the apparatus, being shaped for that purpose, and the front and rear ends of the tank are indicated at 2 and 3, forming an air tight vessel. The tank is covered with an asbestos sheet 4, and is wound with cords 5 to give a good hold. The asbestos is a nonconductor of heat and will protect the hands of the workman. Supported by and extending through the rear end 3 of the tank is an air pump 6 of common construction by means of which pressure is pumped up in the tank sufficient to feed the gasolene. The pipe connections to the tank, for supplying the tool heater and also the work heater, are attached by means of a threaded pipe 7 and an internal nut 8. The pipe communicates through fitting 19 to a discharge opening 12 which leads to the mixing chamber of the tool heater, and the fitting 19 is also connected by a system of pipes to the jet opening 11 of the work heater or torch 60, the flow being controlled by the needle valve 17. The pipe sections 20 and 21' connecting the work heater and the T-fitting 19 are arranged at an angle to each other, with swiveling joints at 46 and 47 formed by channeled plugs fitting in casings attached to the pipes, and so constructed that the heater can be turned at various angles with respect to the soldering iron. A pan 55 is attached to the pipe section adjacent to the burner, for generating purposes. The universal joint provided by the parts 46 and 47 enables the blue flame of the work heater to be directed to the desired position to heat the work being operated on, and particularly may be made to converge toward or with the point of the soldering tool, so that the point of application of the solder can be readily heated. When not needed the burner can be shut off by the valve 17, and turned up or down or around out of the way.

The heater chamber for the soldering iron is indicated at 13, and receives its supply of fuel from the hole 12 which is controlled by a needle valve 18. The orifice 12 discharges first into a pipe 22 which is connected to the chamber 13, the outer wall 14 of which has an opening in which the end 23 of the pipe 22 fits. The pipe has air openings 25 in the side, controlled by a thimble 26 having similar openings, which may be turned to regulate the supply of air to the mixing and combustion chamber. The chamber is held on the end of the pipe 22 by means of a pair of strips 30 which are fixed to a flange 33 projecting from the fitting 19, by means of bolts 32. The strips 30 are slotted at the outer end, these slots engaging rivets 34 or 34ª on opposite sides of the casing 14. The ends of the strips project under straps 36 which are pivoted at 37 to the casing and are adapted to swing over the ends of the strips 30 and engage rivets 38. The strips 30 also have hooks 39 pivoted thereto at 40 and arranged to engage the rivets 34 and 35. The rivets 35 are fixed in the straps 36 and project on both sides thereof to be engaged both in the slot in the strips 30 and by the hooks 39. By means of the strips, the straps, and the hooks, the casing of the combustion chamber is fastened firmly on the end of the pipe 22. The soldering iron 130 is fixed in the end of the casing, in the frame 15, by means of the screw 16.

In Fig. 2, the casing 14 is shown connected at an angle to the end of the pipe 22. It may be connected in longitudinal alinement therewith, as shown in Fig. 3. For this purpose, the rear end of the casing has another opening in which the pipe 22 may be fitted. In case it is desired to use a straight tool, the method of fastening will be the same as above described, except that the bands 36 will be turned to engage the rivets 37ª, instead of the rivets 38. In order to cover the opening which is not being used, a lid 42 is provided, which swings on a hinge 44 which is held in place against the side of the casing 14 by means of the pipe 22, and when said pipe is changed to the other opening the cover 42 may be used to cover the opening from which said pipe was removed. By this means, the soldering iron can be attached to the burner casing either straight or at a right angle.

In order to hold the burner 60 at the angle or position to which it is turned or set, the devices shown in Figs. 4 and 5 are used. These consist of spring catches 49 which engage in notches 50 in the edge of the adjacent joint casings, the joints consisting of turning plugs and casings, as shown. And springs 51 hold the catches in position. 56 is a cup for initial generation of the fuel for the iron heater. The cup 56 may be filled by means of a pipe 57, shown in dotted lines, which is inserted through one of the openings 25 and extends from the opening 12 to the cup 56, so that the gasolene under pressure will flow from said opening into the cup, where it may be ignited. This pipe 57 is inserted only for this purpose and is then removed. The cup 55 for the work heater can be supplied directly by drip from the opening 11.

Various modifications of the apparatus, with respect particularly to the construction of the tank, pipe fittings and connections, may be made within the scope of the invention, which particularly embodies the idea of supplying a work heater and a tool heater from a single tank, and so connecting them that both may be used at the same time upon the work at hand. This allows very rapid and convenient operation, especially where a large number of fine joints have to be made.

I claim:

1. An implement comprising a handle having a fluid fuel chamber, a branched pipe extending from said chamber, a self heating tool holder adjustable to various angles at the end of one branch, and a work heating burner at the end of the other branch, the latter branch having a universal joint therein permitting adjustment of the burner to any desired position or inclination with respect to the tool.

2. The combination with a handle having a fuel feed pipe projecting therefrom, of a tool holder arranged to fit in various positions against the end of said pipe and having straps on the sides thereof, said straps being provided with projections, strips attached to the pipes and adapted to fit against the sides of the tool holder and under said straps, and hooks pivoted to the strips and arranged to engage said projections.

3. The combination with a handle having a fuel feed pipe projecting therefrom, of a tool holder having end and side openings and adapted to be connected to the pipe at either of said openings, means to attach the holder to the pipe in either position, and a hinged lid mounted on the pipe and arranged to be swung thereon to close either opening.

In testimony whereof I affix my signature, in presence of two witnesses.

JACOB WISE.

Witnesses:
N. SHARFF,
H. G. BATCHELOR.